/ 106-81
9/1/81

AU 113 EX
XR 4,287,103

United States Patent [19]
Francis et al.

[11] 4,287,103
[45] Sep. 1, 1981

[54] JOINT COMPOSITION INCLUDING STARCH

[75] Inventors: George W. Green, Portland; Hubert C. Francis, Aloha, both of Oreg.

[73] Assignee: Georgia-Pacific Corporation, Portland, Oreg.

[21] Appl. No.: 120,680

[22] Filed: Feb. 11, 1980

[51] Int. Cl.$^3$ ............................................. C08L 1/28
[52] U.S. Cl. .................................. 260/17 R; 106/77; 106/78; 106/80; 106/81; 106/85; 106/109; 106/114; 106/115; 260/17.4 ST
[58] Field of Search ............ 260/17.4 ST, 17 R; 106/193 R, 214, 109, 114, 115

[56] References Cited
U.S. PATENT DOCUMENTS

| | | | |
|---|---|---|---|
| 2,322,930 | 6/1943 | Gardner | 106/214 |
| 3,003,979 | 10/1961 | Ptasienski et al. | 260/17.4 ST |
| 3,279,934 | 10/1966 | Schuppner | 106/193 |
| 3,297,601 | 1/1967 | Maynard et al. | 260/17.4 ST |
| 3,342,761 | 9/1967 | Wilkinson | 260/17.4 ST |
| 3,386,933 | 6/1968 | Genzabella | 260/17.4 ST |
| 3,411,926 | 11/1968 | Gogek et al. | 106/214 |
| 3,483,156 | 12/1969 | Mills, Jr. et al. | 260/29.6 |
| 3,725,324 | 4/1973 | Cummisford | 260/17.4 ST |
| 3,891,453 | 6/1975 | Williams | 106/85 |
| 3,900,434 | 8/1975 | Bruschtein | 260/17 R |
| 3,907,725 | 9/1975 | Forte et al. | 260/17 R |
| 3,998,769 | 12/1976 | Lane et al. | 260/17.4 ST |

*Primary Examiner*—Edward M. Woodberry
*Attorney, Agent, or Firm*—Alexis Barron; John T. Synnestvedt

[57] ABSTRACT

A filler composition of the type used to hide the joint of adjoining wallboard panels and comprising filler, binder, bulking agent and improved starch-bodying agent, and optionally a water retention agent.

25 Claims, No Drawings

JOINT COMPOSITION INCLUDING STARCH

FIELD OF THE INVENTION

This invention relates to a filler composition and more specifically to a filler composition particularly adapted for use with wallboard, also commonly referred to as dry wall, gypsum board and plaster board.

Wallboard comprising a set gypsum core sandwiched between paper facings is used extensively in the building industry for constructing interior walls and ceilings. Such partitions are formed by affixing to studs or other support elements wallboard panels (for example, in size about 4'×12'×½") in edge-to-edge relationship and often in edge-to-edge contact.

The joint formed between such adjoining panels of wallboard is unsightly, and accordingly, in those applications where the final finish of the wallboard constitutes a paint or wallpaper finish (in contrast to a plaster finish), it is desirable for aesthetic purposes to hide the joint so that the wall or ceiling has the appearance of a smooth, continuous and essentially flat surface notwithstanding that it includes many joints between the several wallboard panels comprising it. As an aid in accomplishing this, the edge portion of a wallboard panel is commonly tapered to provide at the joint between adjoining panels a shallow valley which is filled with a filler composition (referred to commonly as "joint compound" or "joint composition"). By properly filling in the space comprising the valley with the joint composition and sanding the dried form of the composition to a smooth finish, it is possible to hide the joint so that the wall or ceiling has the appearance of a continuously smooth, flat surface. Typically, paper tape is embedded in the joint composition to provide a reinforcement of the joint and several coats of the composition are applied in the effort to achieve the desired smooth appearance. The proper use of joint composition with taper-edged panels and reinforcing tape is an excellent mode for producing a partition which appears to be in all respects monolithic in structure.

Filler or joint composition is used also to cover fasteners, usually nails, which are used to affix a wallboard panel to its support elements. The fastener is oridinarily driven slightly below the surface of the wallboard panel, and the space between the head of the fastener and the planar surface of the panel is filled with joint composition to conceal the fastener head and impart a continuously smooth appearance to the board.

In its ready-to-use form, the typical joint composition is a water-containing, wet, coherent paste-like mass of fine-particle solids capable of being spread readily as it is worked with a tool such as a broad blade knife. In its final form, it is a hard dry solid mass of fine particle solids held together by a binder, one of the essential constituents of a joint composition. In addition to water and binder, the typical joint composition includes also solid filler in fine particle form, a bodying agent and one or more of the following: bulking agent; water retention agent; anti-crack agent; defoaming agent; and preservative. Joint composition is sold in two forms, namely, a dry powdery mass of the constituents which is mixed by the user with water to the desired consistency at the time of use, and in a wet paste form which is referred to as "ready mix" joint composition.

A satisfactory joint composition must possess a variety of properties, including properties related to performance and properties related to application.

With respect to performance, the dried form of the composition must be durable and resist cracking for an extended period of time inasmuch as it forms a permanent part of the partition. In its dried form, it must receive paint or wallpaper in substantially the same way as the wallboard with which it is used. Also, the joint composition must be compatible with the materials with which it makes contact, for example, the paper facing of the wallboard, metallic fasteners, and reinforcing tape.

Equally as important as the performance properties of the joint composition are the application properties of the composition. The composition should have good workability, that is, it should be capable of being shaped easily into a smooth and continuous or unbroken film using a conventional tool, which typically is one having a broad blade. For this purpose, the cohesiveness of the wet paste-like composition should be such that it has little or no tendency to be pulled apart as the blade is used to spread and smooth the composition. Also, the composition should be non-leveling, that is, it should have the ability to retain its shape against the influence of gravity, so that the composition neither runs off the tool during application nor flows or sags from the wall or ceiling after application. Keeping in mind that water is used in forming the composition to its desired consistency, it is important that the composition have good water-retention properties so that when it is applied to the dry paper cover of the wallboard, its water resists being absorbed by the paper from the time the composition is applied until the applicator is finished working it. This can be up to 30 minutes or more. With respect to the ready mix form of the composition, its viscosity should be relatively stable for long periods of time, for example, at least about 6 months from formulation.

The discussion which follows describes various types of materials that have been used in efforts to formulate filler compositions having desired performance and application properties.

REPORTED DEVELOPMENTS

A review of various patents relating to filler compositions of the type used to hide the joint between two adjoining wallboard panels shows that three essential ingredients of the compositions are:

(A) filler, generally a small-particle size, inorganic inert solid;

(B) adhesive binder; and (C) water, which functions to convert the generally dry, powdery ingredients into a paste-like mass that can be worked and spread readily.

Examples of materials which have been reported to be useful as fillers are: limestone ($CaCO_3$); gypsum (calcium sulfate dihydrate); clay; silica; mica; and asbestos. Examples of materials which have been reported to be useful as binders are: casein; starch; animal glues of various types; natural gums; polymeric synthetic resins, including latices, for example, poly(vinyl acetate), a copolymer of ethylene and vinyl acetate, and poly(vinyl alcohol); and a mixture of calcined gypsum (calcium sulfate hemihydrate) and poly(vinyl acetate). For example, see the following U.S. Pat. Nos.: 3,297,601; 3,411,926; and 3,483,156.

As disclosed in the above patents, joint compositions contain other materials which improve or impart desired properties to the basic filler-binder-water composition. Examples of such materials are: thickening agents; water-retention agents; preservatives; surface active agents; and crack-reducing agents. Such materials function to improve performance, workability or stability properties of the composition.

A material which in past years was used widely in joint compositions is asbestos. Early patents, including those mentioned above, characterize the asbestos constituent as a filler, but it was used typically in combination with another filler, usually limestone or gypsum. Several years ago, asbestos was dropped as a constituent of joint compositions as a result of governmental regulations.

There stemmed from research on the development of asbestos-free joint compositions reports that asbestos imparted to joint compositions various important properties which were not achieved when other conventional fillers were substituted for asbestos. For example, U.S. Pat. No. 3,891,453 to Williams refers to asbestos as being a "key ingredient" in joint compositions and discloses that it contributes the following properties: non-leveling (the ability of the composition of retain its shape under the influence of gravity); slip (the ability of the composition to be spread smoothly in a frictionless manner, without drag); and water retention. In U.S. Pat. No. 3,907,725 to Forte and Mudd, there is reference to asbestos fibers being considered an "essential ingredient" and "critical" to achieving the following combination of properties: plasticity; water-holding characteristics such that the composition retains its workability for a desired time period before setting; reduced cohesiveness; and viscosity stability.

For convenience, the term "bodying agent" is used hereafter to refer to a material which imparts to a basic joint composition (filler-binder-water) properties of the type attributed to asbestos, as disclosed in the aforementioned patents.

With reference to the asbestos-free joint composition which is the subject of the aforementioned Williams patent, it includes, in addition to binder and filler (calcium carbonate or gypsum), attapulgus clay and at least one, but preferably both, of the following materials: a water-holding agent, for example, sodium carboxymethylcellulose; or a slip-inducing colloid, for example, an amine-modified montmorillonite clay gel and xanthan gum.

The asbestos-free joint composition which is the subject of the aforementioned Forte and Mudd patent includes also attapulgus clay as an essential ingredient, along with filler (limestone and mica are exemplified), binder (poly (vinyl acetate) and poly (vinyl alcohol) are exemplified, and starch and casein are mentioned), and thickener (hydroxypropyl methyl cellulose is exemplified). In addition, the patent specifies that a floccing agent must be used with the attapulgus clay in order to produce a composition equivalent to one containing asbestos. Floccing agents mentioned in the patent are polyacrylamide resins, a copolymer of acrylamide and an acrylic, and poly(ethylene oxide).

One aspect of the present invention is the provision of an asbestos-free joint composition utilizing an asbestos substitute which is different from those described in the aforementioned patents. As will be described in detail below, the asbestos-substitute which is the subject of the present invention is a particular type of starch.

It has long been known to add various types of starches to joint compositions in which the starch, depending on the type used, functions as a binder (for example, see U.S. Pat. Nos.: 3,003,979; 3,297,601; and 3,411,926) or as a thickener or water retention agent.

The present invention relates to an improved starch-containing filler composition which can be formulated without asbestos and in a manner such that it possesses all of the performance and application properties present in popularly sold commercial formulations.

SUMMARY OF THE INVENTION

In one respect, this invention involves the novel use of a known material in combination with materials which have heretofore been used in filler compositions of the type used to hide the joint of adjoining wall board panels. The known material is a particular type of starch, described with particularity in the examples which follow. For convenience, the particular starch to which this invention relates will hereafter be referred to as "improved starch-bodying agent." Other essential ingredients of the filler composition include: (A) filler; (B) binder; and (C) bulking agent. Water is an essential ingredient of the filler composition also, but the time it is combined with the other ingredients depends on whether the composition is of the ready-mix type or the dry powdery type.

As mentioned above, the use of materials which function as bodying agents in filler compositions is known. The improved starch-bodying agent, which has a relatively high water-carrying capacity, imparts excellent working properties to the composition, and, as will be seen from examples below, compositions with excellent performance and application properties can be formulated. A particularly important advantage that stems from its use is that it is possible to formulate filler compositions which contain fewer ingredients than used normally. In other words, the improved starch-bodying agent itself performs several functions which are performed normally by several ingredients.

It has been mentioned above that it is known to use starches in filler compositions. The composition of the present invention may, but need not, include one or more other starches in addition to the improved starch-bodying agent described below. Such other starches can impart to the composition properties peculiar to the particular starch used and the properties may depend on the proportion of starch comprising the composition. For example, some starches have a capacity for absorbing relatively high amounts of water (high water-carrying) whereas others (low water-carrying) do not have this characteristic. Both of these types of starches generally have the ability to function as a binder. However, the high water-carrying starch is used typically in a relatively small amount for the purposes of its water retention and/or thickening properties, but when used in a relatively small amount, the binding properties of such starches are not exhibited to any significant degree. If the high water-carrying starch is used in a larger amount where its binding properties become significant, then it can effect too great a thickening of the composition. Accordingly, such starches are generally used in a relatively low amount and for the purpose of water retention and/or thickening and not for the purpose of binding. On the other hand, a low water-carrying starch can be used in a relatively high amount at which its binding properties are realized and at which it does not undesirably thicken the composition.

The improved starch bodying agent of the present invention is a high water-carrying starch and it is used typically in an amount at which its binding properties are not exhibited to a significant degree. Accordingly, compositions within the scope of the present invention should include another material which functions as the principal binder constituent. Such a binder can be another type of starch, that is, a low water-carrying starch.

DETAILED DESCRIPTION OF THE INVENTION

In addition to the improved starch-bodying agent, other essential ingredients of the composition of the present invention include: filler, binder and bulking agent, and preferably, but optionally, a water retention agent. Water is an essential constituent of the ready-mix composition in that it is formulated with water and sold in wet form. On the other hand, the dry powdery form of filler composition has water added to it at the time of use.

The filler is a small particle size, inert solid which comprises the principal constituent of the composition in terms of mass and volume. It is recommended that either gypsum (calcium sulfate dihydrate) or limestone be used as the filler because these materials possess the properties desired of a filler and they are relatively inexpensive. Examples of other materials which can be used as a filler are clay and silica flour.

Any material capable of binding the other constituents of the composition in the manner desired of a joint composition can be used. Examples of materials which can be used as a binder in the compositions of the present invention include starch, ethylene vinyl acetate copolymer, poly (vinyl alcohol), poly(vinyl acetate), and butadiene-styrene copolymer. Preferred binders are ethylene vinyl acetate copolymer, poly(vinyl alcohol) and the type of starches used as binders in the compositions of the examples.

Another essential constituent of the composition of the present invention is a bulking agent, that is, a material of relatively low density, and accordingly, one that imparts relatively high volume to the composition without adding much weight. Examples of bulking agents that can be used are diatomaceous earth, mica, aluminum silicate, talc, and calcium silicate. The density of such materials does not exceed about 35 pounds/cubic foot.

Optionally, but preferably, the composition includes a water-retention agent which functions to retard evaporation of water and to keep the water constituent from being absorbed in a blotter-like effect by the paper facing of the wallboard core. The water retention agent can function also to thicken the composition. Examples of materials which function as water retention agents are methyl cellulose, hydroxy ethyl cellulose, guar gum derivatives, alginates and certain starches.

In addition to the aforementioned, the filler composition can include other materials which are used to obtain special effects. The following are exemplary: a preservative which functions to prolong shelf-life of the composition by retarding or preventing the growth of bacteria and/or fungus, for example, phenyl mercuric acetate and 1,2-benzisothiazoline-3-one; a defoaming agent, for example, a mixture of polyglycol and fatty acid type surface active agents; a buffering agent for the purpose of stabilizing pH, for example, soda ash, and magnesium oxide.

Various constituents utilized in the compositions of the present invention may function in several ways. For example, a high-water-carrying starch can function as both a thickener and binder, and mica is considered to be an anti-cracking agent in that it reduces the tendency of the composition to crack. It is noted also that various publications refer to materials such as mica, aluminum silicate and talc as being fillers; however, such materials are of a lower density than those materials (calcium carbonate and gypsum) which are used mostly widely as the principal mass-and volume-constributing constituents comprising the composition. For example, the density of talc is about 32 pounds/cubic foot whereas the densities of calcium carbonate and gypsum are respectively about 70 and about 90 pounds/cubic foot.

A filler composition within the scope of the present invention comprises the following in the stated proportions (unless stated otherwise herein, "%" means approximate percent by weight):

| Constituents | Broad Range, % | Preferred Range, % |
| --- | --- | --- |
| filler | 25 to 93 | 65 to 90 |
| binder | 2 to 12 | 2.5 to 4 |
| bodying agent | 0.5 to 10 | 1 to 3.5 |
| bulking agent | 5 to 50 | 7 to 25 |

With respect to the bodying agent, excellent results have been achieved by utilizing as the only bodying agent the improved starch-bodying agent described in detail in the examples below. However, and as exemplified in the examples, the improved starch-bodying agent can be used in combination with one or more other materials of the type which impart to the composition properties such as those imparted by attapulgus clay and asbestos fibers. When used in combination with other bodying agents, it is preferred that the improved starch-bodying agent comprise at least about 20% of the proportion of bodying agent used.

In addition to the aforementioned constituents, it is recommended that the composition include a water retention agent in a proportion comprising about 0.1 to about 1%, and preferably about 0.3 to about 0.5%.

The following can be included as additives and in the proportions stated: about 0.15 to about 0.5% of preservative; up to about 0.1% of defoaming agent; and up to about 0.2% of buffering agent.

Ready-mix or the dry powdery form of composition can be prepared utilizing the constituents in the proportions stated above, but it should be appreciated that, depending on whether the composition is of the ready-mix or the dry powdery type, and depending upon the particular constituents used, some adjustments may be necessary within the stated ranges to maximize desired properties.

The amount of water included in the composition should be such that the viscosity of the composition, whether it be of the ready-mix or dry powdery type, is preferably within the range of about 350 to about 750 Brabender units at 70° F., and most preferably within the range of about 500 to about 600 Brabender units at 70° F. It should be understood that for any particular formulation, the amount of water needed to obtain the desired viscosity will tend to vary, depending on the particular constituents used.

Filler compositions can be prepared at the time of use by adding water to a dry powdery mass of the following:

| Constituents | Broad Range, % | Preferred Range, % |
|---|---|---|
| filler | 40 to 87 | 60 to 80 |
| binder | 2 to 10 | 3.5 to 5.5 |
| bodying agent | 1 to 5 | 1.5 to 2.5 |
| bulking agent | 10 to 30 | 15 to 25 |
| water retention agent | 0 to 0.5 | 0.15 to 0.3 |

If the improved starch-bodying agent of the present invention is used in admixture with one or more other bodying agents, it is preferred that it comprise at least about 20% of the proportion of bodying agents used.

EXAMPLES

Examples which follow are illustrative of embodiments of the present invention. Unless stated otherwise, the sources for various of the constituents comprising the compositions of the examples were as follows:

TABLE A

| Constituent | Sources |
|---|---|
| hydroxyl propyl methyl cellulose | sold by Dow Chemical Co. under the trademark METHOCEL-240. |
| mica | sold by Diamond Co. as P8OH |
| diatomaceous earth (>86% $SiO_2$) | sold by Cypress Diatomite Co. under the trademark AQUAFIL K-8 |
| aluminum silicate (needle-like) | sold by Glendon Pyrophylite Co. under the trademark PYROPHYLITE SK |
| attapugus clay | sold by Floridin Co. as MINUGEL-FG |
| propylated dent starch (25% amylose with 5% stitution of propylene oxide) | sold by A. E. Staley Manufacturing Co. under the trademark STARAMIC 105 |
| ethylated dent starch (25% amylose with 2.6-2.7% substitution of ethylene oxide) | sold by A. E. Staley Manufacturing Co. under the trademark STARAMIC 747 |
| ethylene vinyl acetate copolymer emulsion including | sold by E. I. duPont de Nemours & Co. as JCM Emulsion |

TABLE A-continued

| Constituent | Sources |
|---|---|
| poly(vinyl alcohol) emulsifying agent | |
| sodium polyacrylate | sold by Para-Chem. Southern Co. under the trademark PARAGUM 146 |
| aqueous solution of mixture of polygylcol and fatty acid type surface active agents | sold by Nalco Chemical Co. under the trademark NALCO-71-D-5 |
| aqueous solution of phenyl-mercuric acetate (30 wt. %) | sold by Troy Chemical Corp. as PMA-30 |

The compositions of the first group of Examples are described in Table 1 below and illustrate the use of various fillers and bulking agents in combination with other ingredients in the ready-mix type composition. Such compositions are prepared typically by mixing thoroughly and individually the dry constituents and the wet constituents, and then combining the resulting mixtures with mixing.

The starch-bodying agent used in the compositions of Table 1 is a hydroxyl propylated waxy starch containing 6–7% substitution of propylene oxide on the starch molecule and containing virtually 100% amylopectin. This starch is referred to in the table as "propylated waxy starch."

It is noted that various of the compositions described in Table 1 include also another starch, referred to in the table as "ethylated dent starch" and described more particularly in Table A. This starch has a relatively low water-carrying capacity and functions as a binder.

Table 1 includes also the results of tests which were used to evaluate the ability of the dried joint compositions of the examples to bond to reinforcing tape of the type used in the joint of adjoining wallboard panels.

TABLE 1

| CONSTITUENTS, WT. % | EXAMPLE NO. | | | | | | | |
|---|---|---|---|---|---|---|---|---|
| | 1 | 2 | 3 | 4 | 5 | 6 | 7 | 8 |
| Filler | | | | | | | | |
| gypsum | — | — | 52.7 | — | 53.2 | — | 53.9 | — |
| limestone ($CaCO_3$) | 55.9 | 53.6 | — | 53.7 | — | 54.9 | — | 54.9 |
| Bulking Agent | | | | | | | | |
| mica | — | 1.1 | 1.2 | 1.1 | 1.2 | 1.1 | 1.3 | — |
| diatomaceous earth | — | 2.7 | 3 | 2.8 | 3.1 | 2.8 | 3.2 | 2.2 |
| aluminum silicate | 6.3 | 2.7 | 3 | 2.8 | 3.1 | 2.8 | 3.2 | 3.3 |
| Bodying Agent | | | | | | | | |
| propylated waxy starch | 0.6 | 0.6 | 0.6 | 0.4 | 0.6 | 0.9 | 1 | 0.5 |
| Binder | | | | | | | | |
| emulsion of ethylene-vinyl acetate copolymer | 3.5 | 3.5 | 3.5 | 2.6 | 2.6 | 1.3 | 1.3 | 3.6 |
| ethylated dent starch | — | — | — | 0.4 | 0.3 | 0.4 | 0.5 | — |
| Water Retention Agent | | | | | | | | |
| hydroxy propyl methyl cellulose | 0.1 | 0.2 | 0.2 | 0.2 | 0.3 | 0.2 | 0.3 | 0.2 |
| Defoaming Agent | | | | | | | | |
| aqueous solution of mixture of polyglycol & fatty acid type surface active agents | 0.06 | 0.06 | 0.06 | 0.06 | 0.06 | 0.06 | 0.06 | 0.06 |
| Preservative | | | | | | | | |
| aqueous solution of phenyl mercuric acetate (30 wt. %) | 0.03 | 0.03 | 0.03 | 0.03 | 0.03 | 0.03 | 0.03 | 0.06 |
| Water | 33.5 | 35.5 | 35.5 | 35.5 | 35.5 | 35.5 | 35.5 | 35 |
| TEST RESULTS - ASTM C474-67 | | | | | | | | |
| Bond - room temperature | 100 | 100 | 100 | 100 | 100 | 100 | 100 | 100 |
| Bond - cold | 100 | 80 | 80 | 80 | 80 | 90 | 95 | not measured |

The excellent bonding characteristics of the filler compositions of Table 1 above are evident from the ASTM test results which show, in each case, that the adhesive bond between the joint composition and tape is uniformly substantially stronger than the cohesive bond of the tape. Evaluation of various of the dried compositions of the examples showed that they exhibited also excellent resistance to cracking and had good sanding properties. It is noted also that the compositions of Examples 4 and 5 were capable of being worked 30 minutes after the time they were applied to a joint between two wallboard sections.

The next group of examples illustrates the use of a commercially available starch as the improved starch-bodying agent in compositions of the present invention.

EXAMPLES 9 to 16

A commercially available starch that can be used in the practice of the present invention is one sold under the trademark "Gelatinized Dura-Gel" by A. E. Staley Manufacturing Company. It is precooked, waxy-maize starch which is classified as "Food Starch-Modified" according to Food Additives Regulation 21 CFR 121.1031 (see Technical Data Sheet TDS 242 271060, Staley Industrial Products, A. E. Staley Manufacturing Co., incorporated herein by reference).

Ready-mix compositions like those of Examples 1 to 8 above are prepared utilizing the aforementioned Gelatinized Dura-Gel starch as the bodying agent. The compositions exhibit application and performance properties like those of Examples 1 to 8.

Additional exemplary filler compositions of the ready-mix type are set forth in Table 2 below.

TABLE 2

| CONSTITUENTS, WT. % | EXAMPLE NO. | | | |
|---|---|---|---|---|
| | 17 | 18 | 19 | 20 |
| Filler | | | | |
| limestone (CaCO₃) | 55.7 | 54.5 | — | — |
| gypsum | — | — | 59.5 | 56.6 |
| Bulking Agent | | | | |
| diatomaceous earth | 2.2 | — | 2.8 | 3.2 |
| aluminum silicate | 3.4 | 6.7 | — | 3.2 |
| Bodying Agent | | | | |
| propylated waxy starch | 0.6 | 0.6 | 0.7 | 1 |
| attapulgus clay | — | — | 1.2 | — |
| Binder | | | | |
| emulsion of ethylene vinyl acetate copolymer | 3.4 | 3.4 | 1.3 | 1.3 |
| ethylated dent starch | — | — | 0.3 | 0.5 |
| Water Retention Agent | | | | |
| hydroxy propyl methyl cellulose | 0.2 | 0.2 | 0.3 | 0.3 |
| Defoaming Agent | | | | |
| aqueous solution of mixture of polyglycol & fatty acid type surface active agents | 0.06 | 0.06 | 0.06 | 0.06 |
| Preservative | | | | |
| aqueous solution of phenyl-mercuric acetate (30 wt. %) | 0.05 | 0.05 | 0.07 | 0.07 |
| Water | 34.1 | 34.1 | 33.7 | 33.7 |

With reference to the composition of Example 19 in Table 2 above, it shows the use of a mixture of bodying agents, that is, the propylated waxy starch of the present invention and attapulgus clay which has been used heretofore as an asbestos substitute. Asbestos is another example of a bodying agent that can be used in combination with the improved starch-bodying agent, but it appears that for the present at least, this would not be advisable because of governmental regulations regarding its use.

The next group of examples illustrates the use of a commercially available improved starch-bodying agent in compositions of the present invention.

EXAMPLES 21 to 24

The compositions of these examples are like those of Examples 17–20 in all respects except that the improved starch-bodying agent is the commercially available starch referred to in Examples 9–16 (Gelatinized Dura-Gel).

It is noted that various of the compositions described in Tables 1 and 2 include as binder a mixture of materials, namely, ethylated dent starch and an emulsion of ethylene-vinyl acetate copolymer (see Examples 4–7 in Table 1 and 19 and 20 in Table 2). The bonding characteristics of starch in a humid environment generally leaves something to be desired. This shortcoming can be mitigated or avoided by using starch, which is a relatively inexpensive material, in combination with another binder such as the copolymer which is the subject of the aforementioned examples.

With respect to the ready mix formulations illustrated in the previous examples, there are set forth below preferred proportion ranges for preferred constituents of such compositions.

| Constituents | Approx. Wt. % | |
|---|---|---|
| | limestone based | gypsum based |
| limestone | 45 to 65 | |
| gypsum | | 45 to 65 |
| polymeric binder | 1 to 3.5 | 1 to 3 |
| starch binder | 0 to 0.5 | 0.3 to 0.5 |
| improved starch-bodying agent | 0.5 to 1 | 0.6 to 1 |
| aluminum silicate | 3.5 to 7 | 2.5 to 3 |
| hydroxy propyl methyl cellulose | 0.25 to 0.3 | 0.2 to 0.25 |
| water | 32 to 38 | 32 to 38 | compositions. Set forth below are examples of dry powdery compositions which can be converted to filler compositions by mixing with water just prior to use. Example 25 includes a starch binder and Example 26 includes poly(vinyl alcohol) as the binder.

| Constiuents, Wt. % | Example 25 | Example 26 |
|---|---|---|
| limestone (filler) | 74.1% | 75.1% |
| ethylated dent starch (binder) | 2.3% | — |
| poly(vinyl alcohol)[1] (binder) | — | 1.5% |
| propylated waxy starch (bodying agent) | 1.8% | 1.7% |
| aluminum silicate (bulking agent) | 19.1% | 17.5% |
| mica (bulking and anti-crack agent) | 2.3% | 3.6% |
| hydroxy propyl methyl cellulose[2] (water retention agent) | 0.2% | 0.2% |
| soda ash (buffering agent) | 0.1% | 0.1% |
| mixture of zincdimethyldithio-carbamate and zinc-2-mercapto-benzthiazole[3] (preservative) | 0.05% | 0.05% |
| Colloid 513DD$^{TM}$ defoamer[4] | 0.1% | 0.1% |
| sorbitol[5] | — | 0.2% |

[1] sold under the trademark of Gelvatol 3000
[2] sold under the trademark Methocel J75-MS
[3] sold under the trademark Vancide 51Z
[4] sold by Colloids Incorporated
[5] it protects the poly(vinyl alcohol) binder by reacting preferentially with borates which may be present in the core of wallboard Filler compositions are prepared from each of the formulations of Examples 25 and 26 by mixing with about 65 parts of water. Use of the compositions shows that they have excellent application and performance properties.

EXAMPLES 27 and 28

The use of aforementioned commercially available Gelatinized Dura-Gel starch as the bodying agent in formulations like those of Examples 25 and 26 yields equivalent results. With respect to dry mix formulations of the type illustrated in Examples 25 to 28 above, there are set forth below preferred proportion ranges for the constituents of such compositions.

| Constituent | Approximate Proportions for | |
|---|---|---|
| | Starch-Binder Comp. | Poly(vinyl alcohol) Binder Comp. |
| filler | 73–81% | 75–80% |
| binder | 1.8–3% | 0.1–0.2% |
| bodying agent | 1.5–2.5% | 1.5–2.5% |
| bulking agent | 13–21% | 15–21% |
| water retention agent | 0.1–0.4% | 0.1–0.4% |
| anticracking (and bulking) agent | 2–7% | 2–7% |
| buffering agent | 0.05–0.2% | 0.05–0.2% |
| defoaming agent | 0.1–0.2% | 0.1–0.2% |
| preservative | 0.05–0.1% | 0.05–0.1% |

In formulations including poly(vinyl alcohol) binder, there can be used advantageously a material which protects the poly(vinyl alcohol) from boron attack in a proportion equivalent to about 0.15 to about 2% of sorbitol.

As to additional examples, there can be used as the improved starch-bodying agent in compositions of the present invention a commercially available starch sold under the trademark Sta-Gel 136 by A. E. Staley Manufacturing Co. The use of this starch results in a composition which has properties substantially equivalent to one containing aforementioned Gelatinized Dura-Gel starch.

In Table 3 below, there are set forth three comparative prior art compositions of the ready mix type.

TABLE 3

| CONSTITUENTS, WT. % | EXAMPLE NO. | | |
|---|---|---|---|
| | C-1 | C-2 | C-3 |
| Filler | | | |
| limestone (CaCO₃) | 53.3 | 53.3 | — |
| gypsum | — | — | 53.6 |
| Bulking Agent | | | |
| mica | 1.1 | 1.1 | 2 |
| diatomaceous earth | 2.8 | — | 2.8 |
| aluminum silicate | 2.8 | 5.6 | 2.8 |
| Bodying Agent | | | |
| propylated dent starch | 0.6 | 0.6 | 0.6 |
| attapulgus clay | 1.1 | 1.1 | 1.2 |
| polycrylate | 0.2 | 0.2 | 0.2 |
| Binder | | | |
| emulsion of ethylene vinyl acetate copolymer | 3.7 | 3.7 | 3.7 |
| Water Retention Agent | | | |
| hydroxy propyl methyl cellulose | 0.2 | 0.2 | 0.2 |
| Buffer | | | |
| sodium carbonate | 0.06 | 0.06 | 0.06 |
| Defoaming Agent | | | |
| aqueous solution of mixture of polyglycol and fatty acid type surface active agents | 0.06 | 0.06 | 0.06 |
| Preservative | | | |
| aqueous solution of phenyl-mercuric acetate (30 wt. %) | 0.05 | 0.05 | 0.07 |
| Water | 34.1 | 34.1 | 32.8 |

Comparison of the application and performance properties of the comparative compositions identified in Table 3 with those of compositions of the present invention exemplified herein shows that the latter are at least as good as the former. Advantageously, compositions of the present invention are lower in cost and they possess improved freeze-thaw stability and workability and they shrink to a lesser extent upon drying.

We claim:

1. A powdery composition capable of being combined with water to form a filler composition of the type used to hide the joint of adjoining wallboard panels, said filler composition being a wet coherent paste-like mass of fine-particle solids capable of being spread readily and drying to form a solid mass, said powdery compositions consisting essentially of filler, binder, bulking agent and improved starch-bodying agent.

2. A ready mix filler composition of the type used to hide the joint of adjoining wallboard panels and being a wet coherent paste-like mass of fine particle solids capable of being spread readily and drying to form a solid mass, said filler composition consisting essentially of filler, binder, bulking agent, improved starch-bodying agent and water, the proportion of water and other constituents being such that said composition has a viscosity within the range of about 350 to about 750 Brabender units at 70° F.

3. A composition according to claim 2 wherein said viscosity is within the range of about 500 to about 600 Brabender units at 70° F.

4. A dry powdery composition for use in preparing a filler composition consisting essentially of:
   (A) about 50 to about 87 wt.% filler;
   (B) about 2 to about 10 wt.% binder;
   (C) about 10 to about 30 wt.% bulking agent; and
   (D) about 1 to about 5 wt.% of improved starch-bodying agent.

5. A composition according to claim 4 including up to about 0.5 wt.% water retention agent.

6. A composition according to claim 4 consisting essentially of:
   (A) about 65 to about 80 wt.% of filler;
   (B) about 3.5 to about 5.5 wt.% of binder;
   (C) about 15 to about 25 wt.% of bulking agent;
   (D) about 1.5 to about 2.5 wt.% of improved starch-bodying agent; and
   (E) about 0.15 to about 0.3 wt.% of water retention agent.

7. A composition comprising:
   (A) about 25 to about 93 wt.% filler;
   (B) about 2 to about 12 wt.% binder;
   (C) about 5 to about 50 wt.% bulking agent; and
   (D) about 0.5 to about 10 wt.% of improved starch-bodying agent.

8. A composition according to claim 7 comprising:
   (A) about 65 to about 90 wt.% filler;
   (B) about 2.5 to about 4 wt.% binder;
   (C) about 7 to about 25 wt.% bulking agent; and
   (D) about 1 to about 3.5 wt.% improved starch-bodying agent.

9. A composition according to claim 7 including about 0.1 to about 1 wt.% water retention agent.

10. A composition according to claim 8 including about 0.3 to about 0.5 wt.% water retention agent.

11. A composition according to claim 7, 8, 9 or 10 including about 0.15 to about 0.5 wt.% preservative; up to about 0.1 wt.% defoaming agent and up to about 0.2 wt.% of buffering agent.

12. A composition consisting essentially of:
(A) about 73 to about 81 wt.% filler;
(B) about 1.8 to about 3 wt.% starch binder;
(C) about 1.5 to about 2.5 wt.% improved starch-bodying agent;
(D) about 13 to about 21 wt.% bulking agent;
(E) about 0.1 to about 0.4 wt.% water retention agent;
(F) about 2 to about 7 wt.% anticracking agent;
(G) about 0.05 to about 0.2 wt.% buffering agent;
(H) about 0.1 to about 0.2 wt.% defoaming agent; and
(I) about 0.05 to about 0.1 wt.% preservative.

13. A composition consisting essentially of:
(A) about 75 to about 80 wt.% filler;
(B) about 0.1 to about 0.2 wt.% poly(vinyl alcohol) binder;
(C) about 1.5 to about 2.5 wt.% improved starch-bodying agent;
(D) about 15 to about 21 wt.% bulking agent;
(E) about 0.1 to about 0.4 wt.% water retention agent;
(F) about 2 to about 7 wt.% anticracking agent;
(G) about 0.05 to about 0.2 wt.% buffering agent;
(H) about 0.1 to about 0.2 wt.% defoaming agent; and
(I) about 0.05 to about 0.1 wt.% preservative.

14. A ready mix filler composition consisting essentially of:
(A) about 45 to about 62.5 wt.% limestone;
(B) about 1 to about 3.5 wt.% polymeric binder;
(C) about 0 to about 0.5 wt.% starch binder;
(D) about 0.5 to about 1 wt.% improved starch-bodying agent;
(E) about 3.5 to about 7 wt.% aluminum silicate;
(F) about 0.25 to about 0.3 wt.% hydroxy propyl methyl cellulose; and
(G) about 32 to about 38 wt.% water.

15. A ready mix filler composition according to claim 14 including:
(A) about 45 to about 62.5 wt.% gypsum;
(B) about 1 to about 3 wt.% polymeric binder;
(C) about 0.3 to about 0.5 wt.% starch binder;
(D) about 0.6 to about 1 wt.% improved starch-bodying agent;
(E) about 2.5 to about 3 wt.% aluminum silicate;
(F) about 0.2 to about 0.25 wt.% hydroxy propyl methyl cellulose; and
(G) about 32 to about 38 wt.% water.

16. A composition according to claim 1, 2, 3, 4, 5, 6, 7, 8, 9, 10, 12, 13, 14 or 15 in which the improved starch-bodying agent includes starch sold under the trademark Gelatinized Dura-Gel.

17. A composition according to claim 1, 2, 3, 4, 5, 6, 7, 8, 9, 10, 12, 13, 14 or 15 in which the improved starch-bodying agent includes starch sold under the trademark Sta-Gel 136.

18. A composition according to claim 1, 2, 3, 4, 5, 6, 7, 8, 9, 10, 12, 13, 14 or 15 in which the improved starch-bodying agent includes a waxy-maize starch.

19. A composition according to claim 1, 2, 3, 4, 5, 6, 7, 8, 9, 10, 12, 13, 14 or 15 in which the improved starch-bodying agent includes a starch containing virtually 100% amylopectin.

20. A composition according to claim 19 wherein said starch is a hydroxyl propylated waxy starch.

21. A composition according to claim 1, 2, 3, 4, 5, 6, 7, 8, 9, 10, 12, 13, 14 or 15 in which the improved starch-bodying agent includes a hydroxyl propylated waxy starch containing 6 to 7% substitution of propylene oxide on the starch molecule and about 100% amylopectin.

22. A composition according to claim 1 including a mixture of bodying agents, and in which the improved starch-bodying agent comprises at least about 20 wt.% of the mixture.

23. A method for preparing a powdery composition capable of being combined with water to form a filler composition of the type used to hide the joint of adjoining wallboard panels, said filler composition being a wet coherent paste-like mass of fine-particle solids capable of being spread readily and drying to form a solid mass, comprising forming said powdery composition by combining filler, binder, bulking agent and a waxy-maize starch.

24. A method for preparing a powdery composition capable of being combined with water to form a filler composition of the type used to hide the joint of adjoining wallboard panels, said filler composition being a wet coherent paste-like mass of fine-particle solids capable of being spread readily and drying to form a solid mass, comprising forming said powdery composition by combining filler, binder, bulking agent and a starch containing virtually 100% amylopectin.

25. A method according to claim 24 wherein said starch is a hydroxyl propylated waxy starch.

* * * * *

UNITED STATES PATENT AND TRADEMARK OFFICE
CERTIFICATE OF CORRECTION

PATENT NO. : 4,287,103
DATED : September 1, 1981
INVENTOR(S) : Hubert C. Francis and George W. Green It is certified that error appears in the above—identified patent and that said Letters Patent is hereby corrected as shown below:

Col. 7, line 26      "Diamond Co." should read --Diamond Mica Co.--.

Col. 10, line 37      "compositions." should read --The above examples are illustrative of ready-mix filler compositions.--

Signed and Sealed this

Twenty-third Day of February 1982

[SEAL]

Attest:

GERALD J. MOSSINGHOFF

Attesting Officer      Commissioner of Patents and Trademarks